Patented June 17, 1947

2,422,175

UNITED STATES PATENT OFFICE 2,422,175

VARNISH AND METHOD OF MAKING THE SAME

Laszlo Auer, South Orange, N. J., assignor to Ridbo Laboratories, Inc., Paterson, N. J., a corporation of New Jersey No Drawing. Application April 3, 1944, Serial No. 529,407

17 Claims. (Cl. 106—218)

This invention relates to surface-coating compositions having improved properties, and to the art of producing such compositions. More particularly, it is concerned with surface-coating compositions of the varnish-base type which incorporate China-wood oil, or another fatty acid-polyhydric alcohol ester of similar properties, as a part of the varnish base. Still more particularly, it comprises the discovery that improved properties may be imparted to compositions of the sort described by incorporating in the varnish-base material an admixture of rosin and rosin-hydrocarbons as more fully discussed hereinafter.

The precise nature and scope of my invention will be better understood from a brief statement of some of the problems which it solves. In discussing this matter, the term China-wood oil is used as typifying a special class of fatty acid esters, all members of which present similar problems to the varnish maker.

China-wood oil (or, as it is sometimes known, tung oil) is one of the most valuable raw materials in making protective and decorative coatings of the oil-resin type. The fact that it contains three double bonds in conjugated position is believed to be responsible for its fast-drying properties, for the hardness of its films, and for the good chemical resistance of coatings containing it. Also, the physical properties of films containing China-wood oil are very satisfactory from both the aesthetic and utilitarian points of view.

In making China-wood oil varnishes, however, several difficulties arise. If the varnish-base material containing or consisting of China-wood oil is not heated for a sufficiently long time and at a sufficiently high temperature, the resultant coating will form a "frosted" finish on air drying. For some purposes frosting is not objectionable, and may even be desirable, as in the production of wrinkle finishes; however, for most industrial applications, a glossy and smooth film is required.

Even where China-wood oil varnishes initially yield glossy, or at least smooth films, they still may manifest, under extreme conditions, the phenomenon known as "gas checking." This phenomenon is characterized by the appearance of "crow's-foot" cracks. It appears in situations where the paint or varnish is applied in a room in which there is an open flame, for instance, in a kitchen having a gas range, or in industrial finishing shops where drying ovens are heated internally with gas flames. It sometimes occurs even in the absence of an open flame in situations where air currents are set up by closed heating units. Both frosting and gas checking can be avoided if the varnish-base materials are properly cooked, that is, at high temperatures and for relatively long intervals. Unfortunately, however, it is difficult to cook varnish bases containing China-wood oil to such a degree as to overcome the disadvantages mentioned, because China-wood oil gels instantaneously and very easily when cooked at high temperatures and for long periods. Even the most experienced varnish makers now and then "lose a batch" in the course of continuous operation.

In preparing a varnish base incorporating China-wood oil it is, of course, conventional to add a varnish resin. Some of the well-known varnish resins are capable of retarding the tendency of China-wood oil to gel, and/or of assisting in gas-proofing such oil. Unfortunately, however, most resins of this type do not yield a light colored varnish when cooked with China-wood oil. To obtain light colored varnishes such as are necessary to prepare white enamels or white paints, it is customary to use ester gum or resins made by the condensation of rosin, maleic anhydride and glycerine. The resins last mentioned are known by the generic name of maleic resins. The maleic resins, and also the ester gums do not have the characteristic of retarding the gelation tendency of China-wood oil; in fact, many of the ester gums and also many of the maleic resins actually appear to increase the danger of premature gelation. Further, they do not contribute to the gas-proofing of the oil.

THE PROCESS

The process of the present invention makes possible the preparation of improved varnishes comprising China-wood oil and practically any type of varnish resin desired, including ester gum and maleic type resins. The varnishes made according to my process are fast drying, non-frosting, and "gasproof," and are characterized by producing tough films with a very hard surface.

It has been found that if even a small addition of a mixture of rosin and rosin-hydrocarbons be added to a varnish base containing China-wood oil, the base can be cooked for a long time and at a high temperature with much less likelihood of gelation. The quantity of the addition may range from say 5% to about 20% of the oil content. Because the varnish base can be cooked in this way, it becomes relatively much easier to produce a gasproof surface coating material. It should be noted that gasproof varnishes containing China-wood oil are characterized by a much faster through drying, and the formation of much tougher films than varnishes which have not been cooked to the degree necessary to render them gasproof.

The mixture of rosin and rosin-hydrocarbons referred to just above may be prepared in either of three ways. One method is partially to decarboxylate a material containing acidic rosin. The result will be a mixture of acidic rosin and decarboxylated rosin. The decarboxylated rosin may, for preference, be described as a rosin-hydrocarbon, and the admixture will be referred to hereinafter as a rosin:rosin-hydrocarbon, or R:RH mixture.

Another method is simply to mix acidic rosin with rosin which has been extensively decarboxylated (thereby yielding the rosin-hydrocarbon component) in whatever proportions are needed to give the desired acid value to the mixture. It is, of course, possible to obtain the rosin-hydrocarbon by the treatment of rosin derivatives or from various forms of treated rosin. For instance, stabilized rosins, such as hydrogenated rosin or isomerized or polymerized rosin may be used. However, I prefer to employ natural rosins as the starting material for the production of rosin-hydrocarbons, particularly gum and wood rosins, although many other acidic natural resins such as the copals may be used with equally good results.

A third method of producing an R:RH mixture is to blend rosin with a commercially available rosin oil. Rosin oil is a product of the destructive distillation of rosin and is commercially available in several fractions. I prefer for the process of the present invention to use a rosin oil fraction with a distillation range between 200–360° C. or, better still, between 250–360° C. It is advisable that lower fractions should not be present in the rosin oil used, because they may boil out of the varnish cook. Therefore, the rosin oil used for the present process should not comprise any considerable proportion of fractions boiling below 250° C.

For reasons pointed out hereinafter, I prefer that the R:RH mixture should comprise rosin which has not been destructively distilled, but which has instead been partially or extensively decarboxylated by heat treatment. Such treatment involves heating the rosin to a fairly high temperature, usually in the neighborhood of from about 275 to 325°. It is possible to effect decarboxylation at somewhat lower temperatures and at somewhat higher temperatures under certain circumstances, depending upon the nature of the material being treated and control of the treatment, as by operating at reduced pressure, by making use of the particular characteristics of various decarboxylation-promoting agents, and so on. It is apparently advantageous to use certain decarboxylation-promoting agents in effecting decarboxylation. This is especially desirable since it makes it possible for the reaction to occur at a lower temperature and in a shorter time interval.

The rosin:rosin-hydrocarbon mixtures obtained by partially decarboxylating rosin, with or without auxiliary agents, or by blending acidic rosin with extensively-decarboxylated rosin, seem to be preferable to those mixtures which are obtained by blending acidic rosin with rosin oil (which is a product of the destructive distillation of rosin). Where the rosin is destructively distilled, the rosin molecule undergoes marked changes. It is most probable that the hydrophenanthrene nucleus is cracked, producing molecules of smaller size. This explains the presence of the large number of distinctly different fractions which may be obtained by fractionating crude rosin oil, which is itself a product of the destructive distillation of rosin. It should be noted that the rosin molecule undergoes not only a primary cracking in the first destructive distillation, but is also subject, during the redistillation of the rosin oil (to separate the various fractions), to a further destruction of the molecule, causing the formation of additional and unwanted low-boiling components.

Where the rosin is decarboxylated by heat, with or without the assistance of decarboxylation-promoting agents, but without permitting any considerable amount of destructive distillation to occur, the structure of the original hydrocarbon nucleus is, I believe, preserved.

Accordingly, for best results, I prefer to use, as the rosin-hydrocarbon component of the mixture, products obtained by decarboxylating acidic natural resins without destructive distillation. In other words, I prefer to use the products which remain in the kettle in which the decarboxylation is carried out, rather than the distillates obtained in producing rosin oil. Still further, I prefer to use rosin which has been decarboxylated in the presence of decarboxylation-promoting agents, especially where the agent employed has made possible decarboxylation at relatively lower temperatures.

PREPARATION OF R:RH MIXTURES

Various methods for producing the R:RH mixture are given below:

EXAMPLE A 300 parts of wood rosin and 15 parts by weight of p-toluene sulpho chloride are heated under a vacuum of about 25″ to 27″ of mercury, without stirring, to a temperature of about 260° C. to 290° C., this temperature being maintained for about 4 hours.

The product obtained from this example has a consistency approximating that of a heavy oil, and has an acid value of about 40 to 60.

If gum rosin is used, instead of wood rosin, in this example, the temperatures should be kept closer to the higher limit.

EXAMPLE B 300 parts of rosin are heated with 15 to 30 parts by weight of zinc carbonate under a vacuum of about 25″ to 30″ of mercury, for about 10 to 12 hours, at about 270° to 280° C.

The product obtained from this example, when using 15 parts of zinc carbonate, has a consistency approximating that of a plastic resin with cold flow and has an acid value of about 60 to 80.

EXAMPLE C 1000 parts of wood rosin are heated with 6 parts of p-toluene sulphonic acid and 24 parts of p-toluene sulpho chloride, under vacuum (100 mm. Hg pressure) for 3 hours, at a temperature of 270° C.

The resulting product is an oily material of viscosity from Z to Z–1 in the Gardner scale, and of color 17 also in the Gardner scale. The acid number is 4.1 and the loss in weight is about 16.5%.

EXAMPLE D 1000 parts of wood rosin N are heated with 10 parts of p-toluene sulphonic acid under vaccum (100 mm. Hg pressure) for 5 hours, at a temperature of 270° C.

Th resulting product has a viscosity of about Z–5 and a color of 18, both in the Gardner scale. The acid number is 3.4 and the weight loss is 15%.

EXAMPLE E 80 parts of the product of Example D, having an acid number of 3.4, and 20 parts of gum rosin, having an acid number of 165, are heated together until the gum rosin dissolves in the decarboxylated product of Example D. The temperature should not exceed 100° C. An R:RH mixture results, with an acid number of approximately 35.7. This product is suitable in my process to treat China-wood oil as described in the specification.

EXAMPLE F

A medium rosin oil is used in this example, having an acid number of 20 and obtained (a) by destructive distillation of rosin and (b) by fractionation of the resulting crude rosin oil distillate. The rosin oil fraction should be one having a distillation range of about 260°–320° C. 80 parts of this rosin oil, having an acid number of 20, and 20 parts of wood rosin, with an acid number of 162, are blended together at a temperature not exceeding 100° C., until the mixture forms a homogeneous flux. The resulting product will have an acid number of approximately 48.4 and will be suitable for use in cooking varnishes containing China-wood oil.

As to the mixing techniques of Examples E and F, little need be said. But as to decarboxylation treatments, such as illustrated in Examples A to D, it should be noted that various side reactions may also occur.

For instance, with the use of some decarboxylation-promoting agents, changes of an intramolecular nature, affecting the arrangement of the double bonds, may occur, in addition to the elimination of the carboxyl group. Moreover, some agents will manifest a tendency to promote polymerization, as may be seen from the increase in the undistillable residue remaining after subjecting the decarboxylated material to high-vacuum distillation. Again, it will be found that some agents will also act to dehydrogenate the molecule. In short, various special characteristics may be imparted to the rosin during decarboxylation by the selection of appropriate decarboxylation-promoting agents. Several techniques and agents for effecting decarboxylation are described in issued patents. Reference may be had, for instance, to United States Patents 2,311,200, and the series 2,311,508 to 2,311,511. It is an advantage of the present invention that the decarboxylated rosin used may be one which has been given such additional special characteristics, without impairment of its utility as a component of the R:RH mixture, and frequently, in fact, with improvement in its utility, as where desirable reaction products formed by the decarboxylation promoting agents are retained in the mixture.

During the decarboxylation process, still other changes may occur, apparently resulting from colloidal transformations in the rosin (which I believe to be an isocolloid).

Treatments of the types mentioned in Examples A to D result in limited decarboxylation of the rosin, leaving a mixture of rosin and rosin-hydrocarbons in varying proportions, depending upon the nature and extent of treatment. This may be measured by the acid value of the material. Thus, with a typical rosin having an initial acid value of 160, the treatment is preferably carried out to reduce the acid value to a point lying between about 4 and 120. This range gives mixtures varying from about 75% to 2% rosin and from about 25% to 98% rosin-hydrocarbons. When the proportion of rosin-hydrocarbons is high, the acid value of the R:RH mixture as used can be very easily adjusted by adding acidic rosin.

For many purposes I have found that a desirable acid value range for the mixture as used is from 20 to 80. The lower limit of this range (20) corresponds to a 1 to 7 ratio between rosin and rosin-hydrocarbons. On the other hand, the upper limit (80) corresponds to a 1 to 1 ratio between rosin and rosin-hydrocarbons.

PREPARATION OF VARNISHES

In preparing a varnish incorporating China-wood oil and a rosin:rosin-hydrocarbon mixture such as is herein disclosed, the following examples will be helpful. These examples are intended merely to suggest one or two suitable procedures. Many variations will occur to the skilled varnish maker, all within the scope of the general teaching given herein.

EXAMPLE 1

*Short oil varnish—10% R:RH mixture*

| | |
|---|---|
| China-wood oil_____grams__ | 125 |
| 4½ hour bodied linseed oil_____do____ | 25 |
| A maleic type varnish resin_____do____ | 135 |
| The rosin:rosin-hydrocarbon mixture produced in accordance with Example A and having an acid number of 60 grams__ | 15 |
| Mineral spirits_____do____ | 250 |
| 6% cobalt naphthenate drier_____cc__ | .75 |
| 6% manganese naphthenate drier____cc__ | .2 |
| 16% lead naphthenate drier_____cc__ | .2 |

The proportions given will yield a varnish of approximately 12½ gallon length, the rosin:rosin-hydrocarbon mixture being calculated as a part of the resin component. It will be noted that the proportion of rosin:rosin-hydrocarbon to the total oil content of the varnish is about 10%.

In preparing the varnish the maleic resin, the R:RH mixture, and the China-wood oil are heated in 36 minutes to a temperature of 310° C. On reaching this temperature the mixture is chilled back to 280° C. by adding the linseed oil. The temperature is held at this point for 20 minutes. The kettle is then removed from the fire and allowed to cool to 220° C. Mineral spirits are added at this stage, followed by the addition of the drier combination mentioned. The resulting varnish under air drying conditions will dry to a dust-free stage in ½ hour. Slight tack will be observed in 4 hours; slight print in 6 hours, and a very good through dry in 24 hours. The varnish if tested in a Bell jar for 60 minutes at 60° C. will be found to be completely gasproof.

To emphasize the improvement, a similar formula, but using 150 grams of maleic resin and omitting the R:RH mixture, may be cooked. If it does not gel before reaching 310° C., it will be necessary to chill back very quickly to avoid gelation. Thereafter, if it can be reheated to 280° C. without gelling, it will be possible to cook it at that temperature for only a few minutes—possibly four or five. In the absence of adequate cooking, the final varnish will gas-check badly after only ten minutes in the Bell jar test. It will take more than twice as long to dry to a dust-free stage. Although it will through-dry in 24 hours, the ultimate film will not be as tough as that produced from varnishes cooked in the presence of the R:RH mixture.

In Example 1, above, and also in Examples 2 and 3, below, a maleic resin of the type commercially available under the trade name of Lewisol 2-L or Arochem 520, may be employed. The former is a product of the Hercules Powder Company, Wilmington, Delaware, while the latter is produced by Stroock and Wittenberg Corporation, of New York city, New York. Several other maleic resins are commercially available at this time. Some of these may be more difficult to cook than the resins used in the examples here given.

If difficulty is encountered in obtaining a satisfactory cook without gelation, the proportion of maleic resin may be somewhat reduced, and the proportion of R:RH mixture may be correspondingly increased. For instance, in making a 12½ gallon varnish, such as is illustrated in Example 1, the amount of R:RH mixture may be increased to 25 grams and the amount of maleic resin reduced to 125 grams. This will give a varnish base in which the R:RH mixture is 16.66% of the oil content. With this slight change in proportions, and following Example 1 in all other respects, a varnish will be produced having all of the improved properties characteristic of the present invention.

EXAMPLE 2

*Short oil varnish—6.66% R:RH mixture*

| | |
|---|---|
| China-wood oil grams | 125 |
| 4½ hour bodied linseed oil do | 25 |
| A maleic type varnish resin do | 140 |
| R:RH mixture as produced in Example A grams | 10 |
| Mineral spirits do | 250 |
| 6% cobalt naphthenate drier cc | .75 |
| 6% manganese naphthenate drier cc | .2 |
| 16% lead naphthenate drier cc | .2 |

The cooking procedure should be the same as that followed in Example 1. The resultant varnish will dry under air drying conditions at a somewhat slower rate during the earlier stages, but at a somewhat faster rate in the later stages. In approximately 45 minutes the film will be dust-free. In 2½ hours it will show medium tack, and in 4 hours will be print-free. If tested in a Bell jar at 60° C. for 60 minutes it will be found to be completely gasproof.

EXAMPLE 3

*Medium-long oil varnish—12½% R:RH mixture*

| | |
|---|---|
| China-wood oil grams | 160 |
| 4½ hour heat bodied linseed oil do | 40 |
| A maleic type varnish resin do | 100 |
| R:RH mixture produced by the process of Example D, but having a acid number of 12 grams | 25 |
| Mineral spirits do | 335 |
| 6% cobalt naphthenate drier cc | 1.1 |
| 6% manganese naphthenate drier cc | .3 |
| 16% lead naphthenate drier cc | .3 |

It will be noticed that in increasing the oil length the proportion of China-wood oil to linseed oil selected is in the ratio of 4 to 1. In the preceding examples the ratio is 5 parts of China-wood oil to 1 of linseed oil. It will also be noticed that the proportion of R:RH mixture to the maleic resin has been increased in this example as compared to the ratio shown in the preceding examples. It will still further be noticed that the proportion of the R:RH mixture with relation to the total oil content is 12½%, in this example.

The cooking procedure in preparing this varnish is much the same as that followed in Examples 1 and 2, except that a somewhat longer cook at 280° C. (30 minutes) is used, and the cooling time should also be somewhat longer so as to reduce the temperature to about 200° C. before thinning. This varnish will also be free of gas checking if tested in a Bell jar at 60° C. for 60 minutes.

Since, as is generally known, long oil varnishes cook more difficulty to a gasproof stage than short oil varnishes, and also are more likely to gel spontaneously during cooking, it is apparent that somewhat larger proportions of the R:RH mixture should be used as the proportion of varnish resin decreases. Accordingly, it may be noted that if less than 12½% R:RH mixture is used in the long oil formula of Example 3, based on the oil content, it is rather difficult to cook the varnish to a gasproof stage. In other words, with smaller proportions of R:RH mixture full advantage is not taken of the gasproofing effect, and the varnish is likely to gel if cooked at a temperature high enough to render it gasproof and impart the other advantages resulting from long cooking at such heats.

Note that a longer cook at 280° C. is possible in Example 3 than in Examples 1 and 2. It is possible to obtain a still longer cook at 280° C. by increasing the proportion of R:RH mixture to the total oil content. For instance, if 20% of R:RH mixture is used in preparing the varnish described in Example 3, instead of the 12½% ratio specified therein, the varnish can be cooked for several minutes longer without danger of premature gelation. This is, of course, of considerable advantage, since the longer the cook the better will be the through drying characteristics and the toughness of the resulting film.

In instances where it is desired to retain the characteristic properties of so-called China-wood oil varnishes it is of importance that the quantity of R:RH mixture added should not exceed about 20%. Up to about 20% the addition of the R:RH mixture does not basically alter the characteristic properties of China-wood oil varnishes but rather enhances those properties, such enhancement being due, at least in part, to the fact that the varnish base may be subjected to longer cooking or to cooking at higher temperature without giving rise to the danger of premature gelation.

It is to be understood, however, that more than 20% of the R:RH mixture may be employed for certain purposes, particularly where some alteration in the characteristic properties of China-wood oil varnish bases is not objectionable.

In the above examples maleic type resins have been used, instead of other resins such as ester gum. The reason for this choice is that the most pronounced difficulties with regard to gelation and gasproofing may be found with maleic resins. Ester gum type resins will act similarly, except that their bodying speed is slower than that of the maleic type resins.

VARIATIONS

It will be obvious to those skilled in the art that the procedures given are applicable to similar processes employing materials having similar characteristics. For example, the characteristics of China-wood oil which make it a particularly desirable varnish ingredient and which also make it a particularly difficult material to incorporate in a varnish are found to a greater or less degree in other fatty oils. As typical of such materials, oiticica oil and dehydrated castor oil may be mentioned. In addition to these oils various synthetic esters which gel easily at high temperatures may be employed in place of the China-wood oil component. Fatty acids having conjugated or isolated double bonds, and which have been esterified with pentaerythritol or other higher polyhydric alcohols having more than three OH groups, are typical of such synthetic materials. Maleinized oils (fatty oils condensed with alpha-beta olefinic di-basic acids or their anhydrides) are members of this class. To emphasize the nature of the oils considered as being within the scope of the invention, it may be said that oils which can be cooked at 300° C. in a varnish base for as long as an hour, without danger of gelation, are not regarded as "fast-gelling." That phrase refers to oils which gel at temperatures near the bottom of the varnish-cooking range—say 240° or 250° C., or which gel in considerably less than one hour at temperatures near the top of that range—say 300° or 325° C.

It is, of course, obvious that oils which are not of the quick-gelling type may be present in addition to the oils here listed, without departing from the spirit of the invention. Thus it will be noticed that in each of the examples given some linseed oil has been employed in addition to the China-wood oil. It should also be noted that a varnish base, though usually containing a varnish resin, may, for the purposes of this invention, contain no other resin ingredient than the R:RH mixture. The expression "varnish base," as used herein, refers to the non-volatile portion of the varnish.

Resins of the ester gum and maleic types are discussed herein because they present unusually difficult problems in connection with the formulation of varnish materials containing China-wood oil. It is apparent, however, that satisfactory varnishes may be made employing resins of other types. A number of well-known varnish resins are listed below:

Copals—Congo, Congo esters, Kauri, etc.
Cumar resin
Indene resin
Rosin esterified with polyhydric alcohols (such as glycols, pentaerythritol, sorbitol, mannitol, etc.)
Rosin-modified phenolic resins
"Pure" phenolic resins (containing alkyl-substituted phenols)
Terpene resins
Limed rosin
Zincked rosin, etc.

These and similar varnish resins are useful in the present process, which is by no means restricted to the preparation of varnishes containing the ester gums or the maleic resins (reaction products of rosin, maleic anhydride, and polyhydric alcohol), although it has special advantages where varnish resins of the type last mentioned are employed.

In short, the advantages gained by the employment of the rosin:rosin-hydrocarbon mixtures herein disclosed can be attained in formulating China-wood oil varnishes even where the varnish resin is not of that type which ordinarily increases the difficulty of cooking a China-wood oil varnish. Similarly, the advantages which are characteristic of China-wood oil varnishes are obtainable to a greater or lesser extent in the formulation of varnishes not based on China-wood oil itself but rather on a specifically different oil but similar in behavior. Oils of this type have isolated or conjugated double bonds, and all seem to be subject to spontaneous gelation at varnish-cooking temperatures. China-wood oil varnishes containing maleic type resins or ester gum have been used throughout this specification as illustrative of the process, because a varnish of this character has an inherent and marked superiority to other varnishes, if properly cooked, while at the same time it is one of the most difficult of all varnishes to cook properly.

OTHER ADVANTAGES

The rosin:rosin-hydrocarbon mixture herein disclosed has advantages beyond those noted above. For instance, it should be mentioned that varnishes incorporating this mixture will keep much better in storage over long intervals than similar varnishes which do not have such an addition. Some China-wood oil varnishes, especially those containing maleic resins, seem to be particularly subject to an afterbodying and even to a partial gel formation during storage. That is, the varnish viscosity increases, and sometimes the varnish forms large gelatinous agglomerates which are suspended in the solution. This phenomenon tends to depreciate the value of the varnishes. I have discovered that the addition of the rosin:rosin-hydrocarbon mixture decreases the tendency of the varnish to form gelled aggregates. Still further, the addition of this mixture greatly reduces the tendency of China-wood oil varnishes, especially the maleic type, to skin over. That is, the R:RH mixture seems to act as an anti-skinning agent.

Furthermore, the R:RH mixture reduces the "livering" tendency of varnishes containing it, when they are used as grinding vehicles for pigments. This is a surprising thing, since the R:RH mixture has an acid reaction, and would therefore be expected to increase the tendency to liver.

It should be stated, perhaps, that it has been known to produce gasproof and non-frosting varnishes from China-wood oil by cooking them at high temperatures in the presence of phenolic resins. This practice, however, results in most cases in the formation of varnishes the films of which have a strongly marked after-yellowing tendency. This is one of the main reasons for preferring to use ester gum or maleic type resins. However, improvement in the properties of China-wood oil varnishes even when made with phenolic resins does result from the addition of the rosin:rosin-hydrocarbon mixture herein disclosed, since the varnish base can then be cooked more quickly to a gasproof stage, or for a longer time at higher temperatures, to increase varnish viscosity, and to impart greater drying velocity, and greater film hardness and toughness, without incurring the danger of premature gelation. Such varnishes will also acquire an increased resistance against the tendency to liver.

SUMMARY

By way of conclusion and summary, it may be said that the better grades of varnishes are those containing fast-gelling oils such as China-wood oil or an equivalent fatty acid-polyhydric alcohol ester, for instance those of the type having multiple conjugated double bonds. The quick-drying, tough, and hard surfaced films which such varnishes are capable of producing can be secured only by cooking the varnish base for relatively long intervals at relatively high temperatures. This type of cooking is most difficult to effect, because oils of this type tend to gel spontaneously at the temperatures required. It is particularly difficult where light-colored varnishes are desired, because the resins capable of producing this sort of varnish either do not alleviate or else actively promote the tendency to spontaneous gelation. It is less difficult where certain other resins are used, but these other resins yield varnishes of an inferior color, and the films produced from them do not retain the initial color, but gradually darken after being applied.

Without adequate cooking at high temperatures, China-wood oil varnishes especially are likely to yield films which will be subject to gas-checking and frosting.

By incorporating, in varnish bases a special mixture of rosin and rosin-hydrocarbons such as is described herein, it becomes possible to cook these materials, without serious risk of gelation, for sufficiently long intervals and at sufficiently high temperatures to impart to the resulting varnish the capacity to produce films having quicker-drying characteristics, greater toughness, and a harder surface, as well as to render China-wood oil varnishes gasproof and non-frosting.

In addition, the incorporation of the rosin:rosin-hydrocarbon mixture reduces the tendency of such varnishes to afterbody, to form agglomerates, and to liver during storage; it also reduces "skinning over" of the varnish in the can.

Even when varnishes of the quick-gelling types are made with dark resins, the addition of the special mixture increases the time interval during which the cook can be safely handled at high temperatures, and thus secures all of the advantages flowing from this fact.

I claim:

1. As a varnish base, the product resulting from cooking, at varnish-cooking temperatures at and above 240° C., (1) a varnish base mixture comprising a varnish resin and a varnish oil selected from the class which consists of China-wood oil, oiticica oil, dehydrated castor oil and esters of the formula "ab" in which "a" represents a long chain unsaturated fatty acid having multiple double bonds and "b" represents the radical of an alcohol having at least four OH groups, and (2) a mixture of rosin and rosin:hydrocarbons constituting from 5% to 20% of the amount of varnish oil present.

2. The varnish base of claim 1, in which the varnish resin is a rosin ester.

3. The varnish base of claim 1, in which the varnish resin is ester gum.

4. The varnish base of claim 1, in which the varnish resin comprises a maleic adduct of rosin.

5. The varnish base of claim 1, in which the varnish oil is the ester of a long chain unsaturated fatty acid having multiple double bonds and a polyhydric alcohol having more than three OH groups.

6. The varnish base of claim 1, in which the ester is China-wood oil.

7. The varnish base of claim 1, in which the ester is dehydrated castor oil.

8. A varnish of the China-wood oil type comprising as the major portion of the vehicle solids the product resulting from cooking, at varnish-cooking temperatures at and above 240° C., (1) a varnish base mixture comprising a varnish resin and a varnish oil selected from the class which consists of China-wood oil, oiticica oil, dehydrated castor oil and esters of the formula "ab" in which "a" represents a long chain unsaturated fatty acid having multiple double bonds and "b" represents the radical of an alcohol having at least four OH groups, and (2) a mixture of rosin and rosin:hydrocarbons constituting from 5% to 20% of the amount of varnish oil present, said varnish being substantially gas-proof and non-checking.

9. A surface-coating composition of the China-wood oil type containing a varnish base material incorporating: (1) a fatty oil having conjugated double bonds, (2) a varnish resin, (3) rosin, and (4) rosin-hydrocarbons, said varnish base material being the product resulting from cooking the base ingredients for a substantial interval at varnish-cooking temperatures at and above 240° C., the sum of the rosin and rosin-hydrocarbon components being equal to from 5% to 20% of the amount of said oil present; said composition being characterized by a substantially reduced tendency to manifest frosting or gas-checking during film formation.

10. As a varnish base, a composition comprising a varnish oil selected from the class which consists of China-wood oil, oiticica oil, dehydrated castor oil and esters of the formula "ab" in which "a" represents a long chain unsaturated fatty acid having multiple double bonds and "b" represents the radical of an alcohol having at least four OH groups, a varnish resin, and from 5% to 20%, in proportion to said varnish oil, of an admixture of rosin and rosin-hydrocarbons, said composition having greatly enhanced resistance to spontaneous gelation when subjected to varnish-cooking at temperatures ranging upwards of about 240° C.

11. In the art of making varnishes of the China-wood oil type, the process which includes the steps of bringing together a varnish resin, an admixture of rosin and rosin-hydrocarbons, and a varnish oil selected from the class which consists of China-wood oil, oiticica oil, dehydrated castor oil and esters of the formula "ab" in which "a" represents a long chain unsaturated fatty acid having multiple double bonds and "b" represents the radical of an alcohol having at least four OH groups, said varnish oil being characterized by a marked tendency to gel spontaneously at varnish-cooking temperatures at and above 240° C., and thereafter cooking the materials named at varnish-cooking temperatures at and above 240° C. for at least fifteen minutes, the ratio of admixture to varnish oil lying between 1:20 and 1:5.

12. In the art of making varnish bases, the process which includes the steps of compounding a varnish base having a varnish oil selected from the class which consists of China-wood oil, oiticica oil, dehydrated castor oil and esters of the formula "ab" in which "a" represents a long chain unsaturated fatty acid having multiple double bonds and "b" represents the radical of an alcohol having at least four OH groups as at least its major oil constituent and containing also rosin and rosin-hydrocarbons, and cooking said base at varnish-cooking temperatures at and above 240° C. for at least 15 minutes, the amount of said varnish oil present being from 5 to 20 times as great as the amount of rosin and rosin-hydrocarbons.

13. The process of claim 12, in which the amount of the rosin-hydrocarbon constituent is from 4 to 49 times as great as the amount of rosin.

14. In the art of preparing varnish bases, the process which comprises adding to a varnish base comprising a varnish oil selected from the class which consists of China-wood oil, oiticica oil, dehydrated castor oil and esters of the formula "ab" in which "a" represents a long chain unsaturated fatty acid having multiple double bonds and "b" represents the radical of an alcohol having at least four OH groups from about 5% to about 20%, based on the amount of oil present, of an admixture of rosin and rosin-hydrocarbons, and cooking the varnish base so formed at varnish-cooking temperatures at and above 240° C. for a time sufficient to render the resulting varnish gas-proof and non-frosting.

15. In the art of making varnishes, the process which includes the steps of adding to an oil-resin varnish base containing a varnish oil selected from the class which consists of China-wood oil, oiticica oil, dehydrated castor oil and esters of the formula "ab" in which "a" represents a long chain unsaturated fatty acid having multiple double bonds and "b" represents the radical of an alcohol having at least four OH groups, a mixture of rosin and rosin-hydrocarbons, in proportions ranging from about 5% to about 20% of mixture in relation to the amount of said varnish oil present, and cooking the base so formed at varnish-cooking temperatures above about 240° C. but below about 325° C. until a varnish base is produced which, after blending with conventional thinners, will produce fast-drying films of marked hardness and toughness.

16. In the art of making varnishes, the method of delaying gelation during varnish cooking of a varnish oil selected from the class which consists of China-wood oil, oiticica oil, dehydrated castor oil and esters of the formula "ab" in which "a" represents a long chain unsaturated fatty acid having multiple double bonds and "b" represents the radical of an alcohol having at least four OH groups, which method consists of bringing together 100 parts of said varnish oil and from 5 parts to 25 parts of an admixture of rosin and rosin-hydrocarbons and mixing them before cooking.

17. The method of extending the safe cooking range of a varnish base material comprising a varnish oil selected from the class which consists of China-wood oil, oiticica oil, dehydrated castor oil and esters of the formula "ab" in which "a" represents a long chain unsaturated fatty acid having multiple double bonds and "b" represents the radical of an alcohol having at least four OH groups and having a known, and relatively narrow, safe cooking range, which method comprises adding to the said material a mixture of rosin and rosin-hydrocarbons in proportions sufficient to inhibit gelation of the varnish base during cooking at temperatures ranging from about 240° C. to about 325° C., the proportion being from about 5% to about 20% by weight of mixture in relation to the remainder of the varnish base material.

LASZLO AUER.

REFERENCES CITED

The following references are of record in the file of this patent:

UNITED STATES PATENTS

| Number | Name | Date |
|---|---|---|
| 1,980,367 | Auer | Nov. 13, 1934 |
| 2,352,172 | Auer | June 27, 1944 |

OTHER REFERENCES

Stevens, "China Wood Oil Formulary," 1924, pp. 72 and 146. (Copy in Div. 64.)